C. S. HARDY.
COMBINED CUTTER AND MIXER.
APPLICATION FILED NOV. 21, 1911.
1,022,315.
Patented Apr. 2, 1912.
3 SHEETS—SHEET 2.
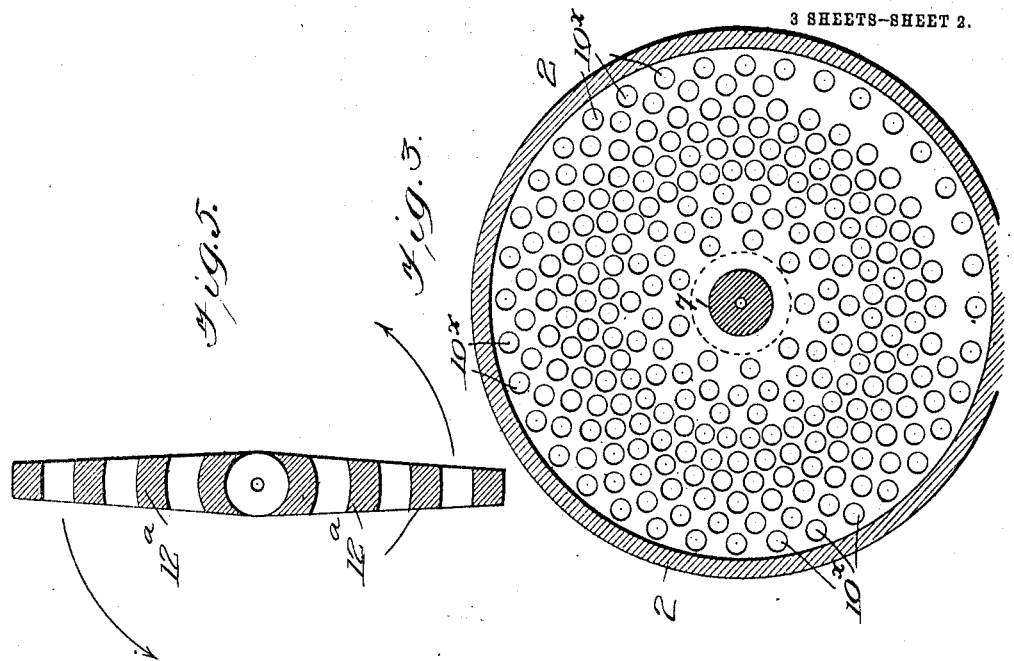
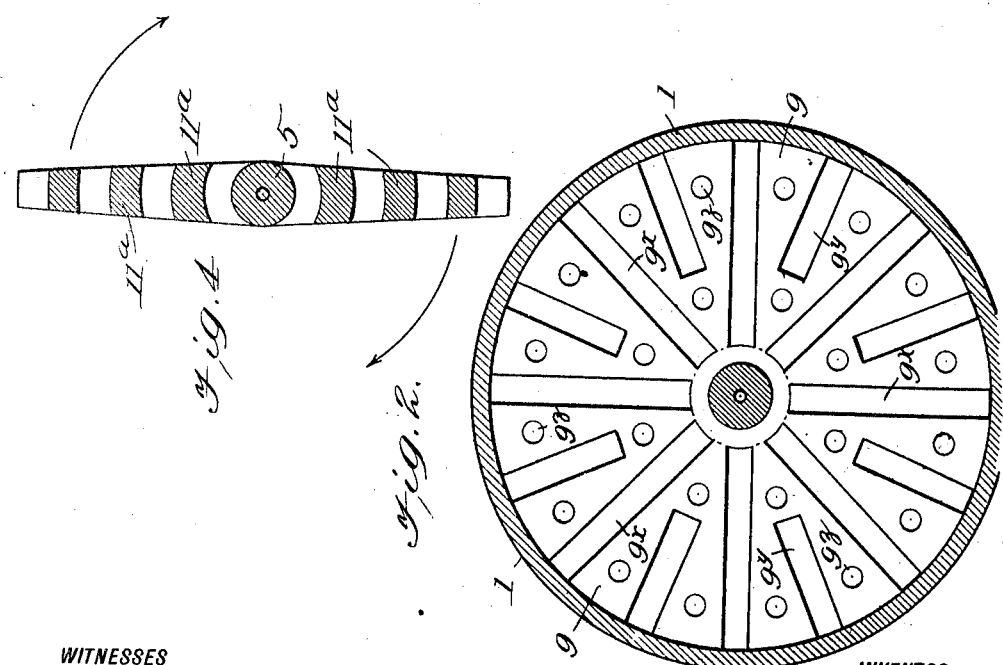
WITNESSES
F. E. Barry
L. A. Stanley
INVENTOR
Charles S. Hardy
BY Munn & Co.
ATTORNEYS C. S. HARDY.
COMBINED CUTTER AND MIXER.
APPLICATION FILED NOV. 21, 1911.
1,022,315.
Patented Apr. 2, 1912.
3 SHEETS—SHEET 3.
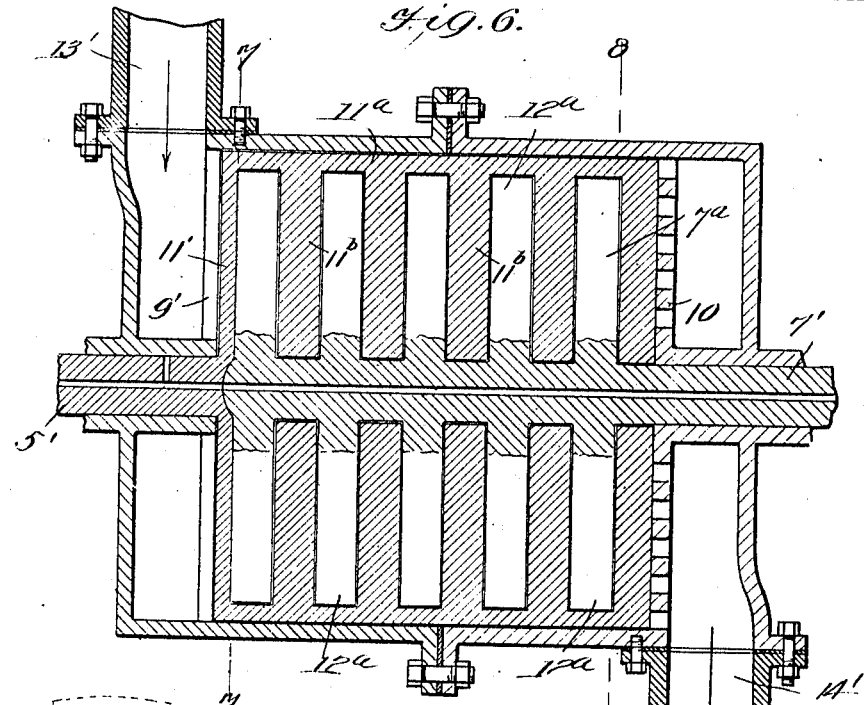
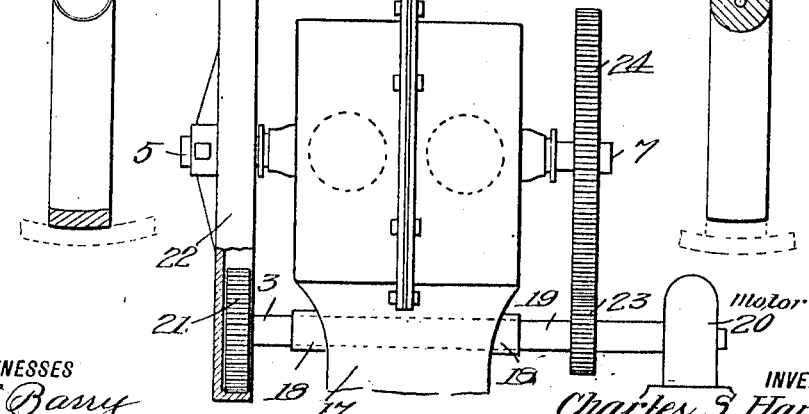
WITNESSES
F.C. Barry
L.A. Stanley
INVENTOR
Charles S. Hardy
BY Munn & Co.
ATTORNEYS

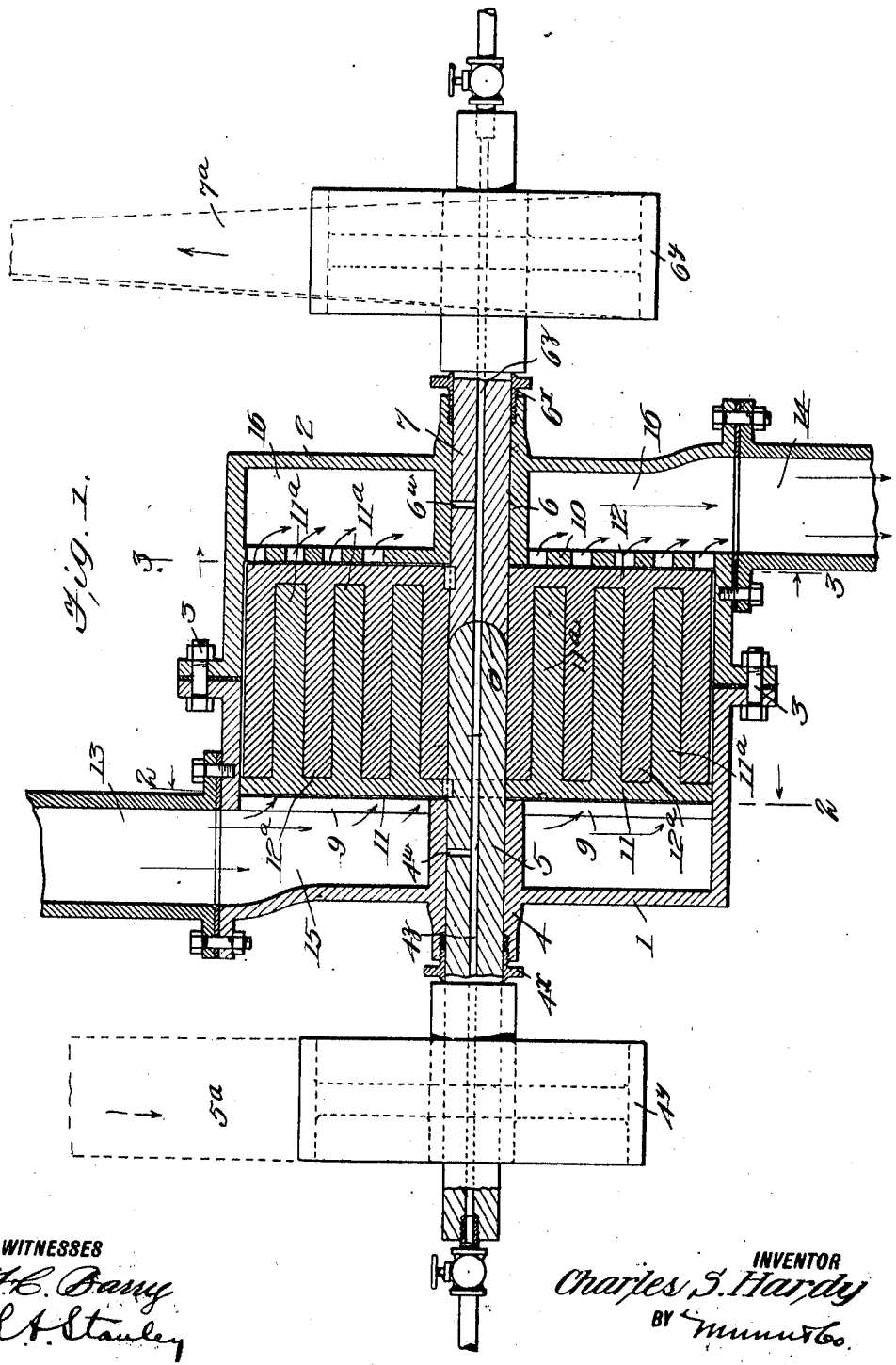

UNITED STATES PATENT OFFICE.

CHARLES S. HARDY, OF SAN DIEGO, CALIFORNIA.

COMBINED CUTTER AND MIXER.

1,022,315.  Specification of Letters Patent.  Patented Apr. 2, 1912.

Application filed November 21, 1911. Serial No. 661,506.

*To all whom it may concern:*

Be it known that I, CHARLES S. HARDY, a citizen of the United States, and a resident of San Diego, in the county of San Diego and State of California, have made certain new and useful Improvements in Combined Cutters and Mixers, of which the following is a specification.

My invention relates to improvements in devices for making or blending compounds to be used as substitutes for lard, and it consists in the combinations, constructions and arrangements herein described and claimed.

The usual method of making these compounds is to place cotton seed oil and beef tallow in a receptacle, to heat these two substances and to blend them by means of paddles or agitators. The mixture thus formed is run over a roll through which a freezing brine is passing, causing the mixed product to be hardened, and as fast as it becomes hard it is scraped from the roll by a knife. It is then passed through strainers before being packed. It is found in practice at times that the stearin of the tallow is apt to harden in lumps which will clog up the strainers, if the latter are too fine. Ordinarily the strainers are of such size as to permit pieces the size of shot to pass through.

An object of my invention is to provide a device by means of which a thick substance such as beef tallow can be mixed with a thin substance such as cotton seed oil to make a homogeneous product, i. e., to cut up the thicker substance into such small particles that the resulting product will be smooth and homogeneous instead of consisting of lumps of one substance mixed with the thinner liquid of the other substance.

A further object of my invention is to provide a device for accomplishing the above named object, which will do away with the necessity of the intermediate operation of straining, the product delivered by my device being finer than that obtained by subsequent straining in the ordinary way.

Other objects and advantages will appear in the following specification and the novel features of the invention will be particularly pointed out in the appended claims.

My invention is illustrated in the accompanying drawings forming part of this application in which similar reference characters indicate like parts in the several views, and in which—

Figure 1 is a horizontal section through the device, Fig. 2 is a section along the line 2—2 of Fig. 1 looking in the direction of the arrows, Fig. 3 is a section along the line 3—3 of Fig. 1, looking in the direction of the arrows, Fig. 4 is a sectional view through one side of the laterally extending arms or knives in the main receptacle, Fig. 5 is a sectional view of the second coöperating set of knives, Fig. 6 is a horizontal sectional view of a modified form of the device, Fig. 7 is a sectional view on the line 7—7 of Fig. 6, Fig. 8 is a sectional view on the line 8—8 of Fig. 6, and Fig. 9 is an elevational view showing the means of rotating the two shafts.

Referring now particularly to Fig. 1, I have shown therein a casing or receptacle composed of the two sections 1 and 2 respectively, these sections being secured together by bolts 3. The section 1 is provided with an integral hub member 4 arranged to receive a shaft 5, while the casing section 2 is provided with an integral hub member 6 arranged to receive a shaft 7. The hub members 4 and 6 are provided with the respective stuffing boxes $4^x$ and $6^x$ and with the pulleys $4^y$ and $6^y$ respectively. The shaft 4 has a longitudinal passage $4^z$ and a lateral conduit $4^w$ extending therefrom for oiling the bearing. The shaft 6 has a similar longitudinal passage $6^z$ with a conduit $6^w$ for oiling its bearings. These two shafts have their inner ends in contact as shown at 8, end of one shaft being hemispherical to fit in the hemispherical recess of the other shaft. The casing section 1 is provided with a partition 9 like that shown in Fig. 2, this partition having the long radial openings $9^x$, shorter radial openings $9^y$ and the circular openings $9^z$. The casing section 2 is provided with a partition 10 like that shown in Fig. 3 having the cylindrical perforations $10^x$. Between the partitions 9 and 10 are disposed the radially extending arms 11 having laterally extending arms or knives $11^a$. The arms 11 are secured to the shaft 5 and one end of the arms 11 lies close to the partition 9. Secured to the shaft 7 are the radially extending arms 12 having the laterally extending knives $12^a$. The shape of the knives $11^a$ is shown in Fig. 4. From this figure it will be seen that one side of these knives is concave and the other side is convex, the edges of the knives being curved on arcs concentric with the axis of the shaft. The knives 12ᵃ are similarly constructed as shown in Fig. 5, but are so spaced that they will move between the arms 11ᵃ. The edges of the arms or knives 11ᵃ and 12ᵃ are sharp and are especially designed for cutting action, and it is this construction to which I desire to call particular attention, since it is the cutting action of this device that insures the mixture of the finely divided product. As shown in Fig. 1, the ends of the lateral knives of one set are so arranged as to just clear the radial arms or knives of the opposite set. They are also arranged so as to just clear the laterally projecting knives of the opposite set. This insures the cutting action. The intake pipe is shown at 13 having communication with the interior of the casing section 1, while the outlet pipe 14 leads from the interior of the casing section 2.

From the foregoing description of the various parts of the device the operation thereof may be readily understood.

The shaft 5 is driven in one direction by means of the belt 5ᵃ, while the shaft 7 is driven in the opposite direction by means of the belt 7ᵃ, thus turning the set of knives 11—11ᵃ in one direction and 12—12ᵃ in the other direction. The mixture of the thin and thick substances, such as cotton seed oil and beef tallow is forced by means of a pump (not shown) through the inlet pipe 13 into the space 15 in the interior of the casing member 1 and passes through the openings 9ˣ, 9ʸ and 9ᶻ in the partition 9, into the space between the partitions 9 and 10 which constitutes the cutting and mixing receptacle. As the material passes through the openings in the partition 9 it is met by the rapidly revolving knives or arms 11, and is cut up. As it is forced along in the path of the rapidly revolving knives 11ᵃ and 12ᵃ it is again cut up and the mixture is intimately agitated, while just before passing through the openings 10ˣ in the partition 10 it is once more subjected to the cutting action of the arms 12. At this stage the product instead of being lumpy is very finely divided, intimately mixed, and homogeneous. The product is then forced out of the space 16 and into the outlet pipe 14 from whence it may be delivered to the packages or other receptacles.

In Figs. 6, 7 and 8, I have shown a modified form in which a shaft 5′ is provided with radial arms 11′ bearing laterally extending arms 11ᵃ having inwardly extending knives 11ᵇ. A second shaft 7′ is provided with radially extending knives 12ᵃ which fit between the knives 11ᵇ. These two sets of knives are designed to be revolved in opposite directions and the charge is designed to be forced through the pipe 13′, through the partitions 9′ and 10′, and out through the outlet pipe 14′ in the manner described.

In Fig. 9 I have shown a modified means for rotating the two shafts in opposite directions. In this figure the base 17 is provided with bearings 18 for a shaft 19. The shaft is run by a motor 20 and is provided at one end with a gear 21 arranged to engage an internal gear 22 on the shaft 5. The shaft 19 bears a similar gear 23 arranged to engage a large gear 24 on the shaft 7. It will be seen that by this arrangement the shafts 5 and 7 are driven in opposite directions.

I am aware that devices have been made in which the charge is passed into a receptacle provided with rotating arms or beaters, but I desire to call attention to the fact that the arms which serve the purpose of agitating or mixing the charge are set so closely together that they shear or cut the charge continuously during this passage through the device as well as mixing it intimately, thus resulting in a smooth homogeneous product, which cannot be obtained by mere beating or agitation.

I claim:—

1. In a combined cutter and mixer, an outer casing, a pair of perforated partitions within said casing, an inlet pipe between one of said partitions and the end of said casing, an outlet pipe between the other partition and the opposite end of said casing, a plurality of sets of knives disposed between said partitions, the individual knives of one set being spaced apart to permit the passage of the knives of the other set, and means for revolving the two sets of knives in opposite directions.

2. In a combined cutter and mixer, an outer casing, a pair of perforated partitions within said casing, an inlet pipe between one of said partitions and the end of said casing, an outlet pipe between the other partition and the opposite end of said casing, a plurality of sets of radially extending knives disposed between said partition, one of said sets of knives being close to one partition, the other set being close to the other partition, and a plurality of sets of intermediate knives, one set of radially extending knives and intermediate knives being arranged to revolve in one direction, and the other set of radial knives and intermediate knives being arranged to revolve in the opposite direction.

3. In a combined cutter and mixer, an outer casing, a pair of perforated partitions within said casing, the perforations in one of said partitions being larger than those in the other partition, an inlet pipe between one of said partitions and the end of said casing, an outlet pipe between the other partition and the opposite end of said casing, a plurality of sets of radially extending knives disposed between said partition, one of said sets of knives being close to one partition, the other set being close to the other partition, and a plurality of sets of intermediate knives, the individual knives of one of said intermediate sets of knives alternating with the individual knives of the other set, one set of intermediate knives just clearing the other, one set of radially extending knives being arranged to revolve in one direction, and the other set of radial knives and intermediate knives being arranged to revolve in the opposite direction.

4. In a combined cutter and mixer, an outer casing, a perforated partition disposed within said casing near one end thereof, an inlet pipe between said partition and the end of the casing, a second perforated partition disposed within said casing near the opposite end, the perforations in said second partition being smaller than those in the first named partition, an outlet pipe between said second named partition and the end of the casing, a pair of shafts carried by said casing, the end of one shaft abutting the end of the other shaft, a series of knives carried by one of said shafts, certain of said knives being spaced apart, a second series of knives carried by the other shaft, said second series of knives being spaced apart to pass between the first named knives, one set of knives just clearing the other set, and the knives being arranged to just clear the partitions, and means for revolving the two shafts in opposite directions.

CHARLES S. HARDY.

Witnesses:
 EDWIN A. THILL,
 ED. S. GIBSON.